United States Patent [19]
Takata

[11] Patent Number: 6,126,372
[45] Date of Patent: Oct. 3, 2000

[54] ARTICLE-FIXING DEVICE AND METHOD FOR REMOVING THE ARTICLE-FIXING DEVICE

[75] Inventor: Tetsuo Takata, Toyama, Japan

[73] Assignee: YU YU Inc., Toyama, Japan

[21] Appl. No.: 09/155,480

[22] PCT Filed: Mar. 31, 1997

[86] PCT No.: PCT/JP97/01117

§ 371 Date: Sep. 29, 1998

§ 102(e) Date: Sep. 29, 1998

[87] PCT Pub. No.: WO97/37140

PCT Pub. Date: Oct. 9, 1997

[30] Foreign Application Priority Data

Mar. 29, 1996 [JP] Japan ................................ 8-077134
Feb. 6, 1997 [JP] Japan ................................ 9-023856

[51] Int. Cl.⁷ .................................................. F16B 21/14
[52] U.S. Cl. ......................... 411/513; 411/502; 411/475; 411/471; 411/463
[58] Field of Search ....................... 411/54, 359, 513, 411/514, 502, 503, 463, 475, 471, 921, 459, 460, 461

[56] References Cited

U.S. PATENT DOCUMENTS

| | | | |
|---|---|---|---|
| 919,631 | 4/1909 | Page | 411/471 |
| 2,034,080 | 3/1936 | Bitzinburger | 411/921 |
| 3,499,359 | 3/1970 | Yrjanainen | 411/461 |
| 4,988,249 | 1/1991 | Kardefeldt et al. | |

FOREIGN PATENT DOCUMENTS

| | | | |
|---|---|---|---|
| 592497 | 8/1925 | France | 411/359 |
| 2808743 | 9/1979 | Germany | 411/502 |
| 52-1363 | 1/1977 | Japan . | |
| 1-501164 | 4/1989 | Japan . | |
| 2-17207 | 1/1990 | Japan . | |
| 2-221708 | 9/1990 | Japan . | |
| 3-78113 | 8/1991 | Japan . | |
| 6-22607 | 3/1994 | Japan . | |

*Primary Examiner*—Flemming Saether
*Attorney, Agent, or Firm*—McDermott, Will & Emery

[57] ABSTRACT

According to the present invention, it is possible to produce an article-fixing device at low cost and in large quantity and also to drive a pin unit in accurate and assured manner, and to firmly mount an object to be fixed. The article-fixing device comprises a pin unit and a washer combined together for supporting an object to be fixed, whereby the pin unit is designed in flat shape and formed by punching a metal plate, has logs in shape of a fork and is extending from a head of the pin unit, and tips of the legs are tapered and spread out, and the washer comprises a pair of guide gaps arranged at opposed positions and for guiding operation to drive the forked legs and for maintaining an angle of driving at a constant angle, the forked legs inserted into the guide gaps are spread out between the pair of guide gaps, and a support base provided between the pair of guide gaps and used for spreading the forked legs inserted into the guide gaps and for maintaining spreading condition of the forked portion of the pin unit.

16 Claims, 24 Drawing Sheets

ARTICLE-FIXING DEVICE AND METHOD FOR REMOVING THE ARTICLE-FIXING DEVICE

TECHNICAL FIELD

The present invention relates to an article-fixing device and a method for removing the article-fixing device. In particular, the invention relates to an article-fixing device suitable for mounting various types of objects on wall surface made of weak board using plaster board, aerated lightweight concrete (ALC) or veneer (hereinafter referred as "weak board"), ceiling, wooden plate wall, and external wall sidings as well as half-dried mortar wall. The invention also relates to a method for removing the article-fixing device by withdrawing a pin unit, which is a component part of the article-fixing device.

BACKGROUND ART

In the past, an article-fixing device of this type has been known from JP-A-2-17207. According to the invention described in this patent publication, a pin unit of the device is produced from a material as shown in FIG. 1 to FIG. 4. To produce the pin unit as shown in the figures, it is necessary to perform at least the following four processes: (1) cutting process to cut a straight wire material to a predetermined length; (2) bending process to bend the wire material to form a head of circular shape using a bending die; (3) serration forming process for forming serrated blades directed downward on outer side of each leg; and (4) machining process to taper tip of each of the legs. Therefore, there have been problems in that it is not suitable for mass production, that it is not possible to produce at the price acceptable in the market, and that the invention is not used in practical application because the product is not merchandised.

DISCLOSURE OF THE INVENTION

To solve the above problems, the present inventor has made strenuous efforts in studying and performing experiment to achieve mass production of the pin unit and to produce at lower cost and has finally succeeded in developing an article-fixing device suitable for the purpose. According to this invention, a pin unit in flat shape is formed by a single process through press punching from a tough metal thin plate, whereby special care is taken on a washer to be combined with the pin unit so that twisting or deformation of pin legs due to the use of thin plate do not occur when pin unit is driven, and an object to be fixed is firmly mounted by driving the pin unit straightforward. Also, the inventor has successfully developed a method for easily withdrawing the pin unit which has been driven into the weak board via washer.

The article-fixing device according to the present invention comprises a pin unit and a washer combined together for supporting an object to be fixed, whereby the pin unit is designed in flat shape and formed by punching a metal plate, has legs formed in shape of a fork and extending from a head of the pin unit, and tips of the legs are tapered and spread out, and the washer comprises a pair of guide gaps arranged at opposed positions and for guiding operation to drive the forked legs and for maintaining an angle of driving at a constant angle, the forked legs inserted into the guide gaps are spread out between the pair of guide gaps, and a support base provided between the pair of guide gaps and used for spreading the forked legs inserted into the guide gaps and for maintaining spreading condition of the forked portion of the pin unit. Also, the washer may comprises an engaging unit to engage with the object to be fixed. Further, a pair of guide gaps having gap width approximately equal to thickness of each leg may be arranged to maintain the driving angle of the forked legs at a constant angle. In addition, a reinforcement rib may be provided along longitudinal direction on flat surface of each leg of the pin unit.

A dented portion dented into the legs may be arranged on each side of the forked portion of the pin unit, and an expanded portion may be provided on each side of the head to match the dented portion. Also, projection may be provided on each side of the head, and the pair of legs may be curved toward outside in bow-shape in order that distance between the two legs will be the narrowest at the middle. Also, serrated blades directed downward may be formed on outer side of each leg, and the washer may be integrally mounted on the object to be fixed.

The method for removing the article-fixing device with a pin unit driven into a weak board via a washer to fix an object according to the present invention comprises the steps of spreading top of the head of pin unit and both sides of the head exposed from the washer, pressing a part of upper surface of edge of the washer from both sides using a washer holder, and withdrawing the pin unit by squeezing both sides of the head of the driven pin unit using pincers or pliers.

BRIEF DESCRIPTION OF THE DRAWINGS

The features of the present invention will become more apparent by referring to the following detailed description given in connection with the attached drawings:

FIG. 54 is used;

BEST MODE FOR CARRYING OUT THE INVENTION

In the following, description will be given on the best mode for carrying out the invention referring to preferred embodiments.

(1st Embodiment)

The article-fixing device according to the present invention comprises a pin unit 1 for supporting an object to be fixed by driving it into a board such as a weak board, and a washer 2 for transmitting supporting force of the pin unit 1 to the object to be fixed. As described later, the washer 2 also has a function to open and spread out legs of the pin unit 1.

Figure 1:
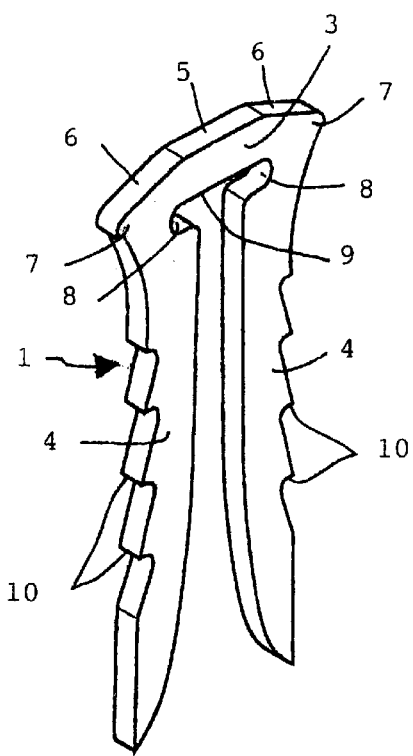
FIG. 1 is a perspective view showing a first embodiment of a pin unit, which is a component part of an article-fixing device according to the present invention.
Figure 2:
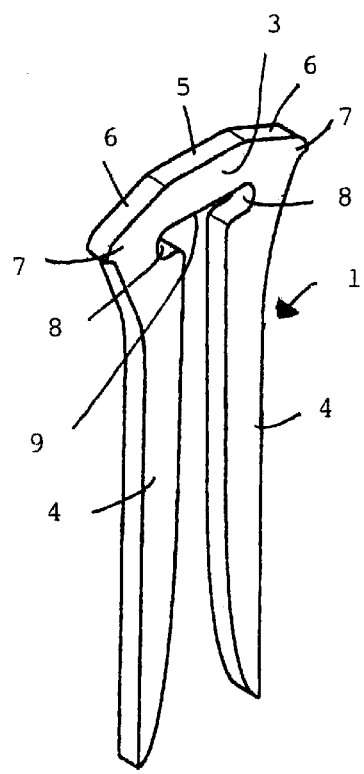
FIG. 2 is a perspective view of a variation of the first embodiment of the pin unit, which is a component part of the article-fixing device of the present invention.

FIG. 1 and FIG. 2 represent respectively a pin unit 1 of a first embodiment and a variation of the article-fixing device of the present invention. The pin unit 1 is in U-shaped form and comprises a head 3 and legs 4 and 4 which are continuous to the head 3 and forked off symmetrically to left and right. It is designed in flat shape and integrally molded by press punching of a metal plate, e.g. a thin but tough stainless steel plate (0.6 to 1.2 mm in thickness).

In other words, the two legs 4 and 4 are extending approximately in parallel so that these legs can be inserted into fixing site in order to fix the object to be fixed, and an upper base of each of the two legs 4 and 4 are connected by the head 3. The two legs 4 and 4 are designed in flat shape, and the pin unit 1 is designed flat as a whole.

When an object is fixed, the pin unit 1 is used together with the washer 2 which will be described later in connection with FIG. 13 to FIG. 16. The washer 2 has two guide gaps 31 and 31 for guiding the two legs 4 and 4 of the pin unit 1, and there is provided a support base 32 between the guide gaps 31 and 31 so that two legs 4 and 4 are opened and spread out when external force is applied on the pin unit 1 and the two legs 4 and 4 are advanced into the guide gaps, entering from the tip to the upper base.

In the present embodiment, distance between opposing faces of the two legs 4 and 4 is increased from the upper base toward the tip of each leg as described later.

Figure 56:
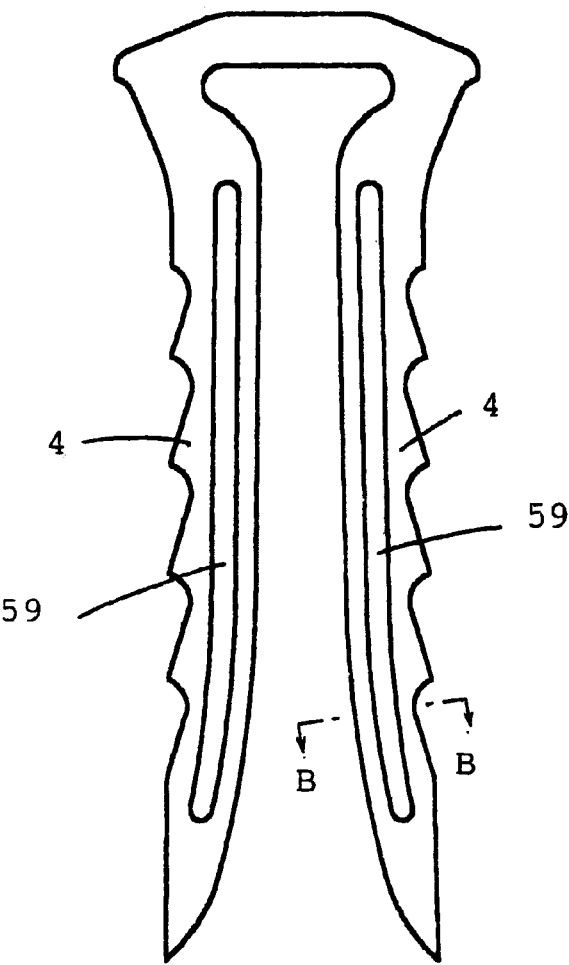
FIG. 56 is a front view showing a variation of the pin unit of the article-fixing device of the present invention.
Figure 57:
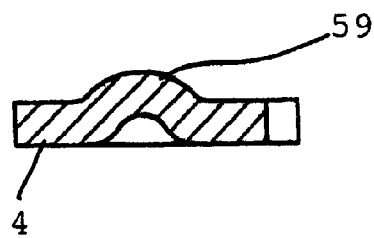
FIG. 57 is a cross-sectional view along the line B—B of FIG. 56 as seen from arrow direction.

In FIG. 1 and FIG. 2, top of the head 3 of the pin unit has a flat surface 5 at the center. When the pin unit is placed with its head 3 above and the tips of the legs 4 and 4 below as shown in FIG. 1, portions on both sides of the flat surface 5 are designed to have downwardly inclined surfaces 6 and 6. On both sides of 4 the head 3, there are provided expanded portions 7 and 7 expanded outwardly respectively. To match the expanded portions 7 and 7, dented portions 8 and 8 dented into the legs 4 and 4 respectively are arranged on each side at a forked portion 9 of the pin unit 1 to provide the forked portion with a wider space. On the other hand, the two legs 4 and 4 are tapered toward the tips with the inner side scraped off toward the tips with the distance between the legs becoming increasingly wider toward the tip. As shown in FIG. 1, serrated blades 10 are formed on outer side of each of the two legs 4 and 4. The serrated blades 10 are designed in such manner that, when the pin unit is placed with its head 3 above, the blades are directed downward, i.e. width of the leg is increased as it goes downward, that is, outer surface of each serrated blade 10 is projected outwardly as it goes downward. In the example shown in FIG. 1, serrated blades 10 are provided, while these blades may be designed in other shape such as corrugated form or irregular form. By designing in such manner that width of the leg is repeatedly changed as it goes from the tip toward the upper base of each of the legs 4 and 4, the legs can be easily driven into mounting site such as plaster board, and fixing force can be increased. On the other hand, in the variation shown in FIG. 2, blades on outer sides of the legs are designed in flat or straight shape. As shown in FIG. 56 and FIG. 57, a reinforcement rib 59 may be provided along longitudinal direction on the flat surface of each of the legs 4 and 4 of the pin unit.

(2nd Embodiment)

Figure 3:
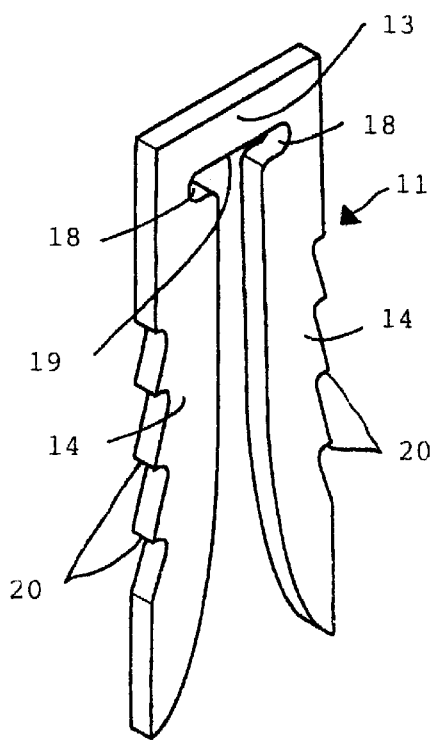
FIG. 3 is a perspective view showing a second embodiment of the pin unit, which is a component part of the article-fixing device of the present invention.
Figure 4:
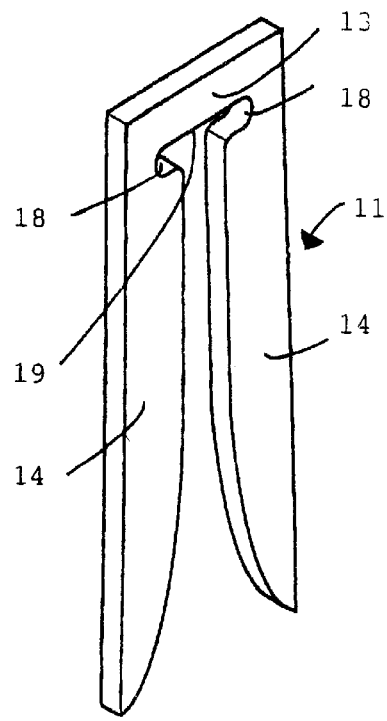
FIG. 4 is a perspective view showing a variation of the second embodiment of the pin unit, which is a component part of the article-fixing device of the present invention.

FIG. 3 and FIG. 4 each represents a pin unit 11 of a second embodiment of the article-fixing device according to the present invention. This embodiment differs from the first embodiment in that the top of the head 13 is designed as straight flat surface and the expanded portions 7 and 7 are not formed on both sides of the head as in the first embodiment, that outer side of each of legs 14 and 14 are extending straightforward from the head 13, and that width of each of the two legs 14 and 14 is wider compared with the first embodiment. The variation shown in FIG. 3 has serrated blades 20 directed downward on outer sides of the legs 14 and 14, while the variation shown in FIG. 4 has outer blade in straight shape. In the same manner as in the first embodiment, these variations have dented portions 18 and 18 arranged at forked portion 19 of the pin unit 11 to provide the forked portion 19 with a wider space.

(3rd Embodiment)

Figure 5:
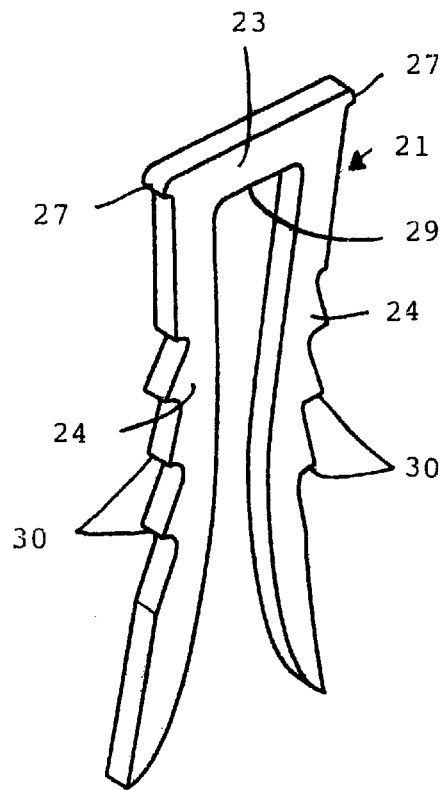
FIG. 5 is a perspective view of a third embodiment of the pin unit, which is a component part of the article-fixing device of the present invention.
Figure 6:
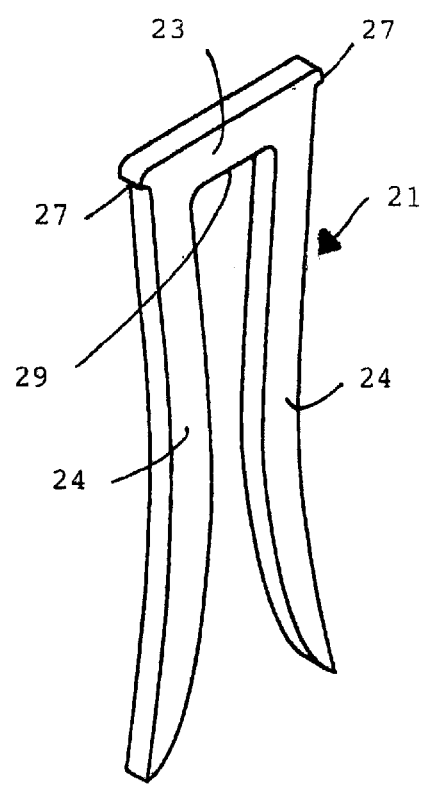
FIG. 6 is a perspective view showing a variation of the third embodiment of the pin unit, which is a component part of the article-fixing device of the present invention.

Further, FIG. 5 and FIG. 6 each represents a pin unit 21 of a third embodiment of the article-fixing device of the present invention. On each side of the head 23, projections 27 and 27 projecting outward are provided, and forked legs 24 and 24 extending from the head 23 are curved outward in bow-shape so that distance between the two legs 24 and 24 will be the smallest at the middle portion of the each of the two legs 24 and 24. The tips of the two legs 24 and 24 are spread out, and a wider space is kept at the forked portion 29 of the pin unit 21. The variation shown in FIG. 5 has serrated blades 30 directed downward on outer side of each of the two legs 24 and 24, while the variation of FIG. 6 has outer blade in gentle curve on each leg.

Figure 7:
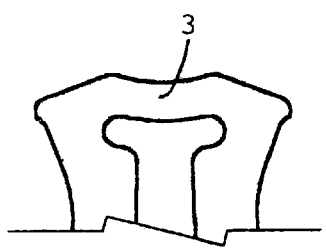
FIG. 7 to FIG. 9 each represents a partial plan view of a variation of a head of the pin unit, which is a component part of the article-fixing device of the present invention.
Figure 8:
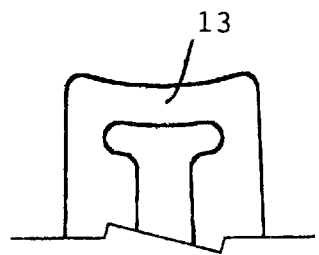
Figure 9:
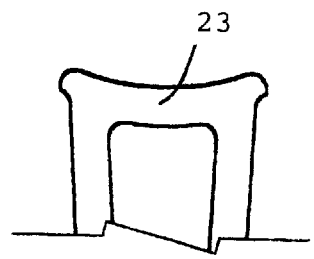
Figure 10:
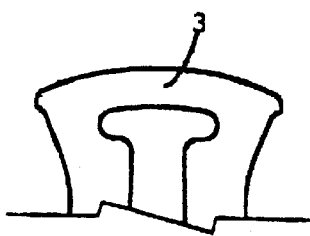
FIG. 10 to FIG. 12 each represents a partial plan view of another variation of the head of the pin unit, which is a component part of the article-fixing device of the preset invention.
Figure 11:
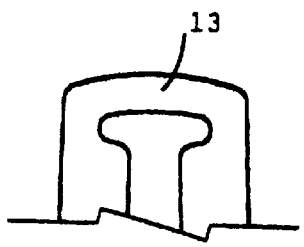
Figure 12:
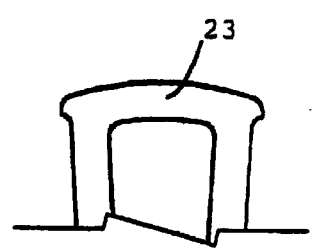

Furthermore, the top of each of the head 3, 13 or 23 of the first to the third embodiments may be designed in concave circular shape as shown in FIG. 7, FIG. 8 or FIG. 9 or may be designed in convex circular shape as shown in FIG. 10, FIG. 11 or FIG. 12.

In the embodiments with the above arrangement, the pin unit 1, 11 or 21 is used to fix various types of objects on a weak board via a washer 2. The washer 2 is designed as follows:

Specifically, as shown in FIG. 13 to FIG. 16, the washer 2 comprises a pair of guide gaps 31 for guiding the operation to drive the leg 4, 14 or 24 of the pin unit 1, 11 or 21 and for maintaining an angle of driving at a constant angle, a support base 32 for spreading each of the legs 4, 14 or 24 and for maintaining spreading condition at the forked portion 9, 19 or 29 of the pin unit, a lower projection 33 to be engaged in a hole at mounting portion of the object to be fixed and pressed against wall surface such as weak board, and a collar 34 engaged with edge of the hole.

Figure 58:
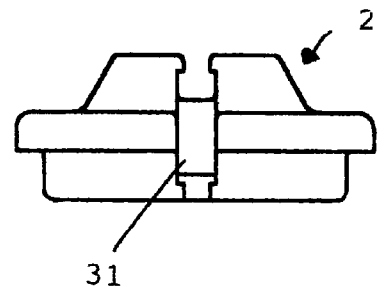
FIG. 58 is a side view of the washer of the article-fixing device of the present invention, showing an example of a washer having guide gaps different from those shown in FIG. 15.
Figure 59:
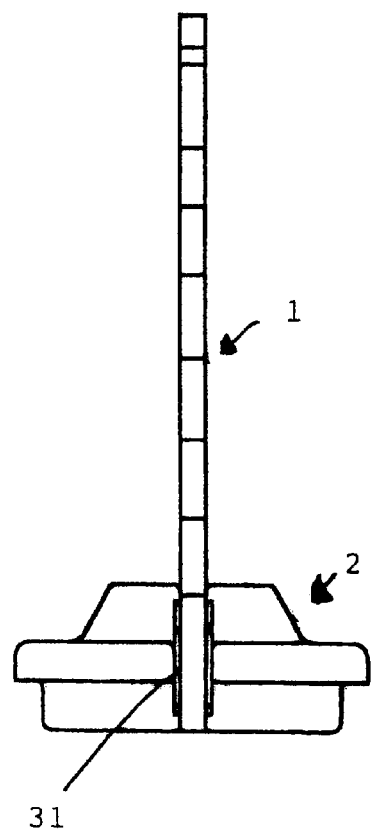
FIG. 59 is a front view showing how the pin unit is engaged with the washer of FIG. 58.
Figure 60:
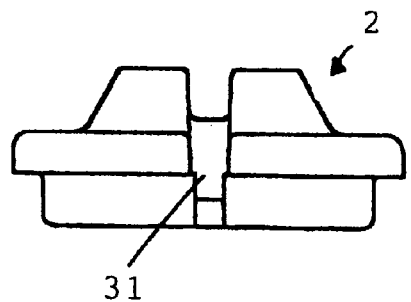
FIG. 60 is a front view of a washer of the article-fixing device of the present invention, showing an example of a washer having guide gaps different from those shown in FIG. 15.
Figure 61:
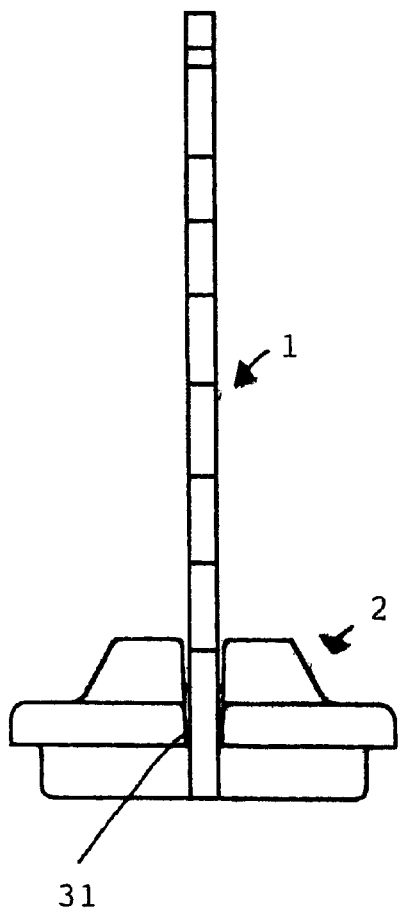
FIG. 61 is a front view showing how the pin unit is engaged with the washer of FIG. 60.

The pair of guide gaps 31 and 31 as described above are arranged at opposite positions on both sides with the support base 32 at the center and these gaps are formed to penetrate the washer in vertical direction. The gap has a width approximately equal to thickness of the pin unit to be driven. As shown in FIGS. 58 and 59 or in FIGS. 60 and 61, a portion of the gap has a width approximately equal to thickness of the pin unit and the remaining portion of the gap may have wider width. When the pin unit has a reinforcement rib 59 as the variation shown in FIG. 56 and FIG. 57, width of each of the guide gaps 31 and 31 is determined to the width including projection of the rib. Naturally, due consideration is given on the gap width regarding tolerance and taper in trimming. Above the guiding gaps 31 and 31 arranged at opposite positions, a receiving gap 35 to receive the head of the pin unit is formed so that the head of the driven pin unit may not protrude from the upper surface of the washer 2. The receiving gap 35 is designed as to be continuous to the guide gaps 31 and 31.

Figure 17:
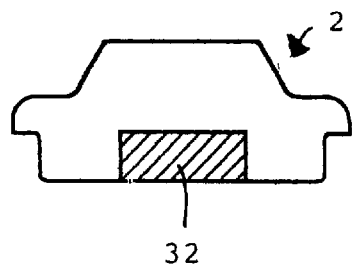
FIG. 17 is a cross-sectional view of a washer, which has a support base different from the washer of FIG. 16.
Figure 18:
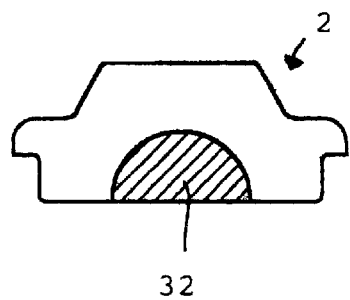
FIG. 18 is a cross-sectional view of a washer having another of a support base different from the washer of FIG. 16.

The support base 32 is designed to have trapezoidal cross-section so that tips of the legs of the pin unit are smoothly spread out when the pin unit is driven and guided by the guide gaps 31 and 31 (See FIG. 16.), whereas the support base is not limited to this, and it may have rectangular or semi-circular cross-section (FIG. 17 and FIG. 18). Specifically, in the variations shown in FIG. 16 or FIG. 18, distance between the two guide gaps 31 and 31, i.e. width of the support base 32, is wider in the direction to guide the two legs 4 and 4 of the pin unit 1 when the object is fixed, and this makes it easier to spread the legs out. However, even when the width of the support base 32 is constant as shown in FIG. 17, the legs can be spread out in the same manner if the distance between opposing surfaces of the two legs 4 and 4 of the pin unit is narrowed down at the middle.

The largest width of the support base 32 (the largest distance between a pair of guide gaps), on which the two legs stride, is set to a value larger than the narrowest distance between the two legs of the pin unit. As a result, the two legs of the pin unit can be effectively spread out. The relationship between the width of the support base 32 and the distance of the two legs near the forked portion is set in such manner that at least a part of side wall of the support base 32 is brought into contact with inner surface of each of the two legs when the pin unit is driven in and the forked portion of the pin unit touches or comes closer to the upper surface of the support base 32. Thus, spreading condition of the legs at the forked portion can be maintained by the support base 32.

Figure 19:
FIG. 19 is a cross-sectional view of a washer similar to the one shown in FIG. 16.
Figure 20:
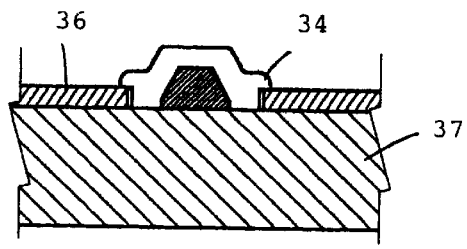
FIG. 20 is a cross-sectional view showing how the washer of FIG. 16 is used.
Figure 21:
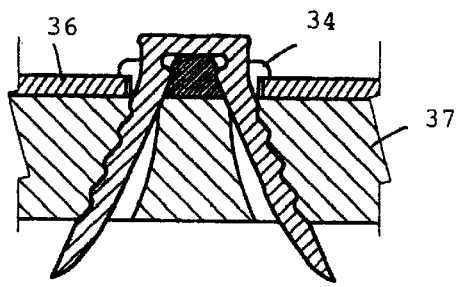
FIG. 21 is a cross-sectional view showing how the washer of FIG. 16 is used when it is used in combination with the pin unit.
Figure 22:
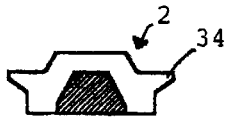
FIG. 22 is a cross-sectional view showing shape of a washer having a collar different from that of the washer of FIG. 16.
Figure 23:
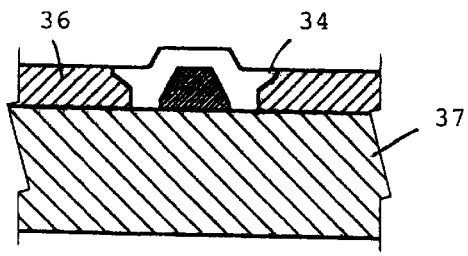
FIG. 23 is a cross-sectional view showing how the washer of FIG. 22 is used.
Figure 24:
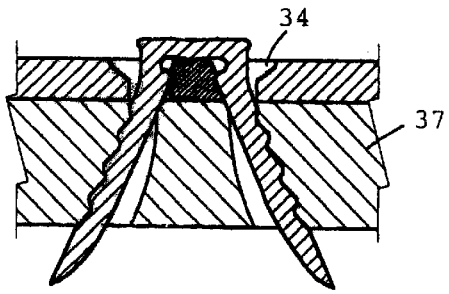
FIG. 24 is a cross-sectional view showing how the washer of FIG. 22 is used in combination with the pin unit.
Figure 25:
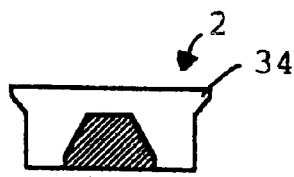
FIG. 25 is a cross-sectional view showing shape of a washer having a collar different from that of the washer of FIG. 16.
Figure 26:
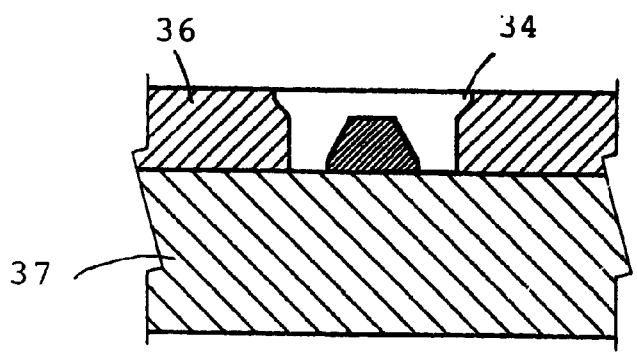
FIG. 26 is a cross-sectional view showing how the washer of FIG. 25 is used.
Figure 27:
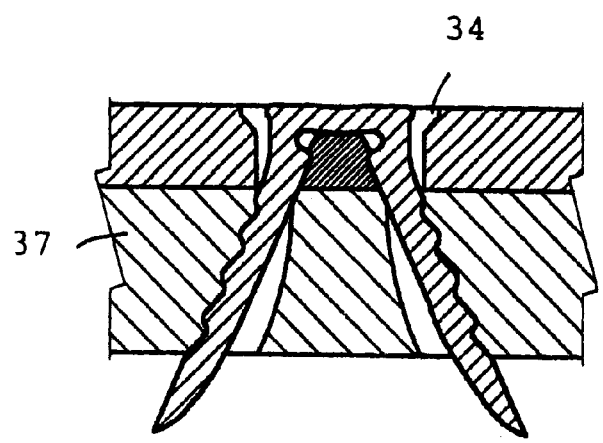
FIG. 27 is a cross-sectional view showing how the washer of FIG. 25 is used when it is used in combination with the pin unit.
Figure 28:
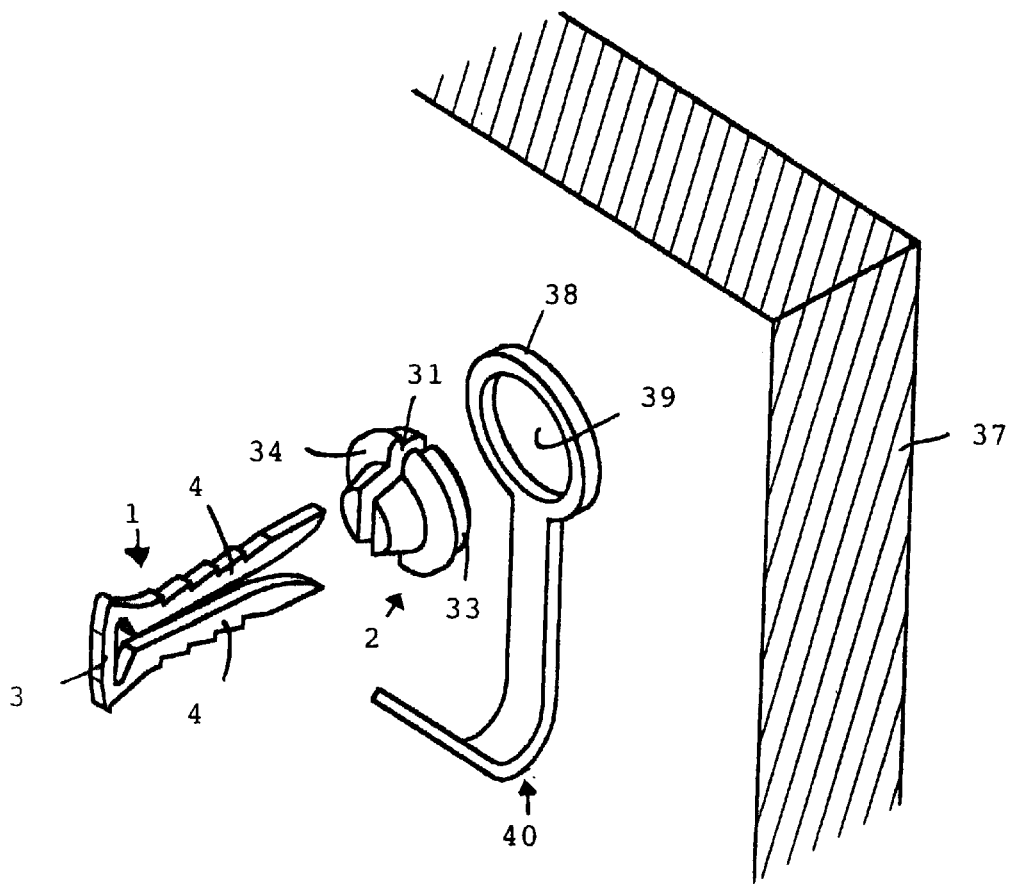
FIG. 28 is an exploded view showing how the article-fixing device of the present invention is used.
Figure 69:
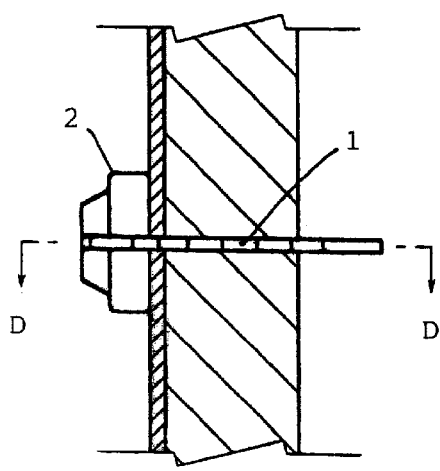
FIG. 69 is a cross-sectional view showing how the article-fixing device of the present invention is used in case the object to be fixed is a poster.
Figure 70:
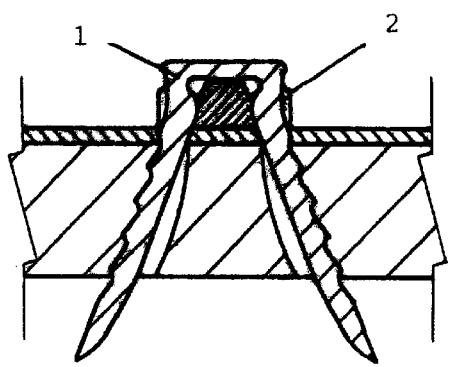
FIG. 70 is a cross-sectional view along the line D—D as seen from arrow direction.

The lower projection 33 can be adequately designed to fit the shape of the hole provided at the mounting portion of the object to be fixed. The collar 34 can be designed in two types depending upon the intended use: That is, to match the mounting member 36 of the object, the collar 34 is designed as flat type when it is used to fit thin mounting member 36 as shown in FIGS. 19, 20 or 21, and it is designed as dish type when it is used to fit thick mounting member 36 as shown in FIGS. 22, 23, or 24, and FIGS. 25, 26 or 27. In case of the dish type, the collar 34 can be designed as to be flush with the upper surface of the washer 2 to suit the case where the mounting member 36 of the object is considerably thick (FIG. 25 and FIG. 26). Reference numeral 37 represents a weak board. In case the object can be directly broken through by the pin unit as in case of poster, calendar, etc., there is no need that the washer 2 has the collar 34 to be engaged with edge of the hole as shown FIG. 69 and FIG. 70. The object can be kept firmly by the pin unit 1, 11 or 21 and the washer 2 as if these serve as thumb tacks.

The washer 2 with the arrangement as described above can be produced by injection molding at low cost and in large quantity from a tough material having high mechanical strength, i.e. impact resistance, compressive strength. As such materials, polycarbonate resin or ABS resin may be used. The washer can also be produced by metal molding using the method such as die-casting or foundry. Further, ceramics having good weatherproof property may be used as the material.

Figure 29:
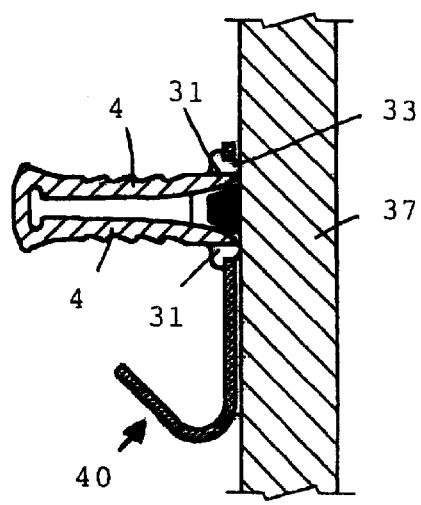
FIG. 29 is a cross-sectional view showing how the article-fixing device of the present invention is used immediately bore an object is fixed.
Figure 30:
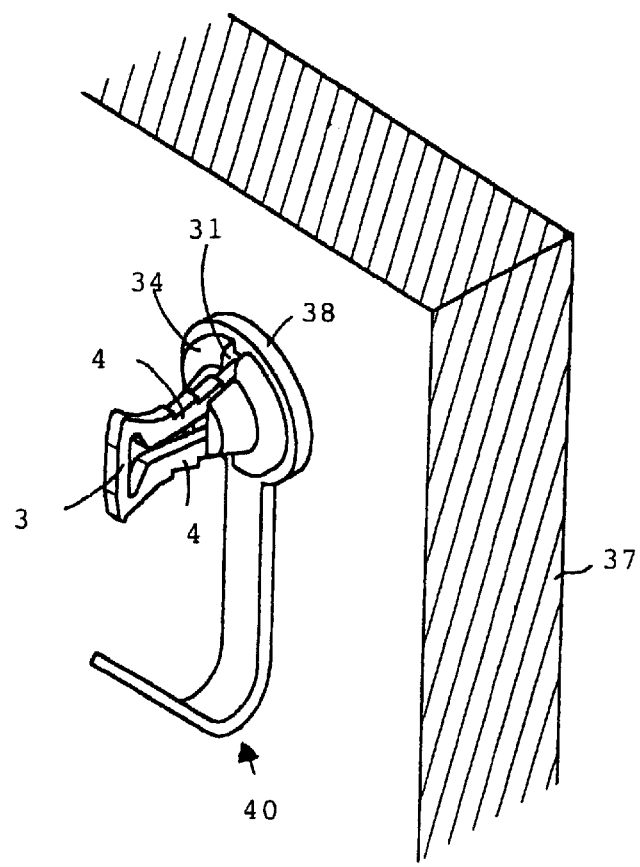
FIG. 30 is a perspective view showing an intermediate stage to fix an object to be fixed from the condition shown in FIG. 28.
Figure 31:
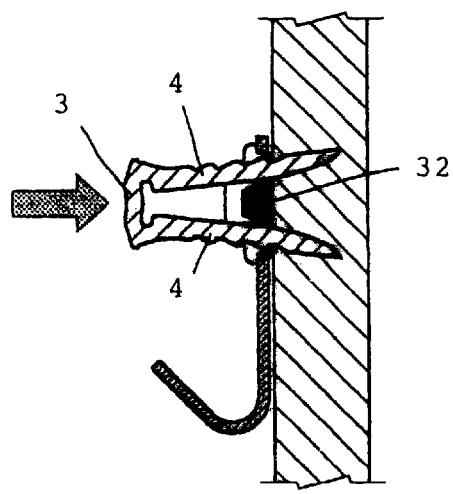
FIG. 31 is a cross-sectional view of the condition of FIG. 30.
Figure 32:
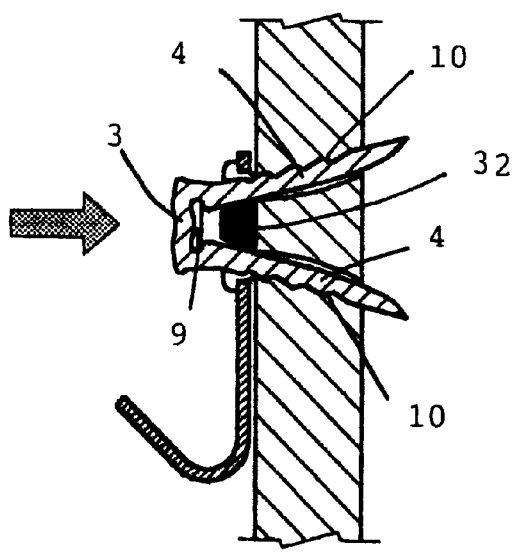
FIG. 32 is a cross-sectional view showing a stage subsequent to at of FIG. 31.
Figure 33:
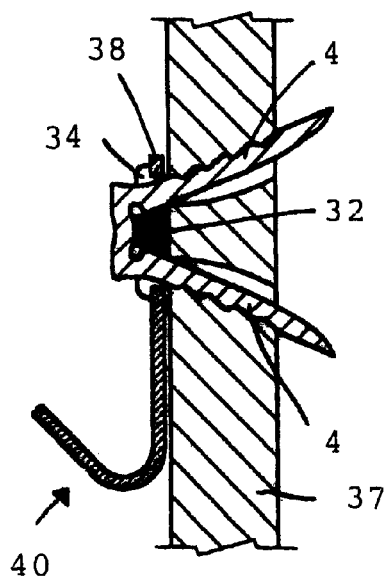
FIG. 33 is a cross-sectional view showing a final stage after the stage shown in FIG. 32.
Figure 34:
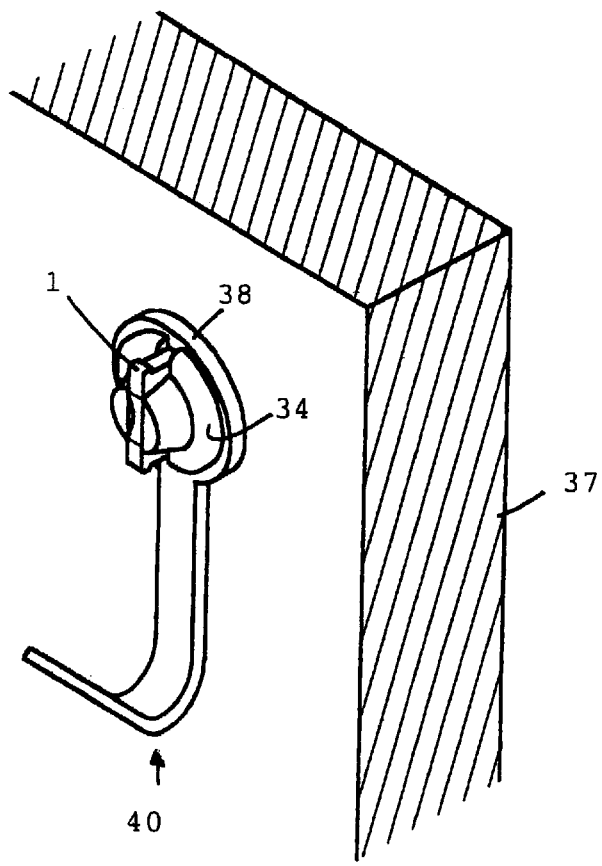
FIG. 34 is a perspective view showing the final stage of FIG. 33.
Figure 35:
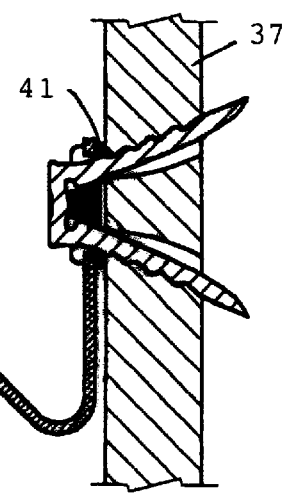
FIG. 35 is a cross-sectional view showing a variation of mounting condition using the article-fixing device of the present invention.
Figure 36:
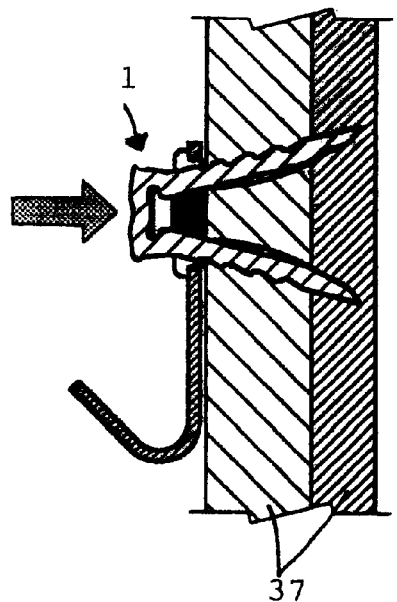
FIG. 36 is a cross-sectional view showing another variation of mounting condition using the article-fixing device of the present invention.
Figure 37:
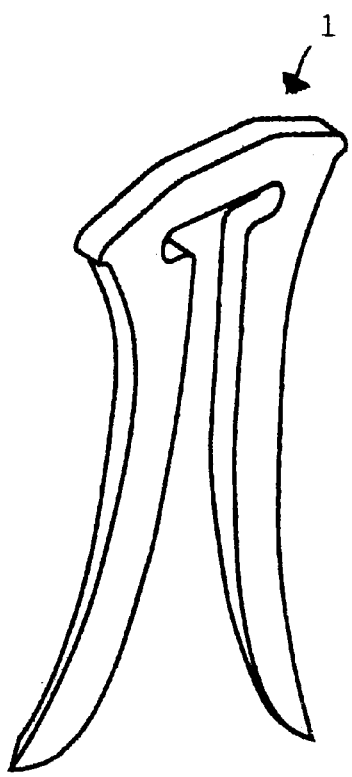
FIG. 37 is a perspective view showing a condition where the pin unit according to the present invention is twisted.
Figure 38:
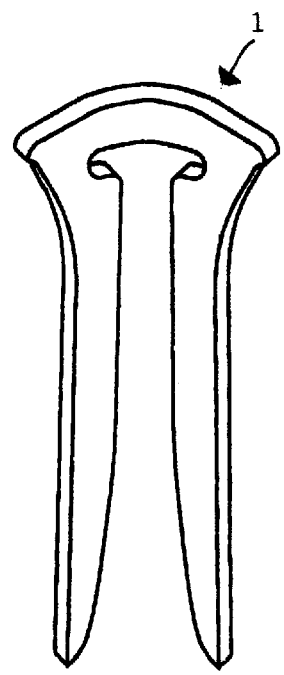
FIG. 38 is a perspective view showing a condition where the pin unit according to the present invention is deformed.

Next, description will be given on a method to use the article-fixing device of the present invention referring to FIG. 28 to FIG. 34. As the pin unit, the pin unit of the first embodiment is used, and a suspension hook 40 having a hole 39 on a mounting portion 38 is used as the object to be fixed. First, the suspension hook 40 is set to a predetermined mounting point on a weak board 37, and a lower projection 33 of the washer 2 is engaged into the hole 39. Tips of the two legs 4 and 4 of the pin unit 1 are inserted into the guide gaps 31 and 31, and the legs are driven into the weak board 37 (FIG. 29). Next, the head 3 is hit using a hammer so that the serrated blades 10 break through the weak board 37. When it is driven deeper, spreading angle of the two legs 4 and 4 is widened by the support base 32 (FIGS. 30, 31 and 32). Finally, the support base 32 maintains the largest spreading angle at the forked portion of the pin unit, and the suspension hook 40 can be firmly fixed (FIGS. 33 and 34). In this case, the collar 34 of the washer is engaged with edge of the hole 39 to prevent the suspension hook 40 from falling off from the weak board 37. As shown in FIG. 35, a buffer material 41 such as rubber vibration isolator may be used between the washer 2 and the weak board 37 via the mounting portion 38 to prevent loosening caused by vibration. Further, FIG. 36 shows how the pin unit 1 is driven into the weak board 37, which is a plaster board lined with veneer plate. The pin unit 1 is held by the guide gaps 31 and 31 having approximately the same width as the thickness of the leg and the two legs 4 and 4 are driven. Therefore, the angle of driving can be maintained in a direction approximately perpendicular to the weak board. As a result, the pin unit can be driven in optimal condition without causing twisting or deformation of the pin unit as shown in FIG. 37 or FIG. 38. Further, because the forked portion 9 of the pin unit 1 has a wider space, stress applied on the head 3 when the legs are spread out can be distributed in wider range, and this makes it possible to prevent destruction of the pin unit caused by stress.

In the above application example, the pin unit 1 is produced by punching of a plate material of 0.6 to 1.2 mm in thickness. If the pin unit has thickness of 0.8 to 1.2 mm, it can have high holding force on a board made of aerated lightweight concrete or veneer plate of 5 mm in thickness. In this case, if outer sides of the legs are designed with serrated blades, the legs can be smoothly spread out, and the spreading angle can be widened. In case the thickness of the pin unit is 0.6 to 0.8 mm, the legs can be smoothly spread out by cutting force such as that of a knife due to the effect of the blade even when serrated blades are not provided. Because the pin unit is thin, the trace or the hole which is formed after the pin unit has been removed becomes almost unnoticeable because the pin unit is thin and it has no serrated blade. However, in case the pin unit has thickness of 0.6 to 0.7 m, it can be sufficiently used on a plaster board, but it may be too thin for a veneer plate and the legs may be bent. The pin unit of 0.8 mm in thickness (without serrated blade) can be effectively used on any of plaster board, aerated lightweight concrete or veneer plate of 5 mm in thickness. When the pin unit of 0.8 mm in thickness with serrated blade was compared with the pin unit without serrated blade and having thickness of 0.8 mm, fixing strength was by about 10 to 20% higher in the pin unit with serrated blade. In case of the pin unit 1 (11, 21) provided with a reinforcement rib 59 as shown in FIG. 56 or FIG. 57, the pin unit can be molded from a thinner plate. As a result, the head can be easily bent, and spreading of the legs can be more smoothly achieved. When it is removed from the board, the legs can be easily and smoothly restored to the initial closed condition because the head is not firm. Further, the case where the pin was driven with the legs spread in horizontal direction was compared with the case where the pin was driven with the legs spread in vertical direction. The suspension hook on wall surface was able to support heavier load in the former case. The highest load when the pin with serrated blades was driven into a plaster board (9.5 m in thickness) was 26 kg in case of horizontal direction, and 15 kg in case of vertical direction. The highest load when the pin with serrated blades was driven into ALC was 38 kg in case of horizontal direction and 18 kg in case of vertical direction.

In the above, description has been given on a case where the pin unit 1 of the first embodiment was used. The same applies to the case where the pin unit 11 or 21 of the second or the third embodiments was used, and it is needless to say that the pin unit can be used by the same procedure.

Figure 39:
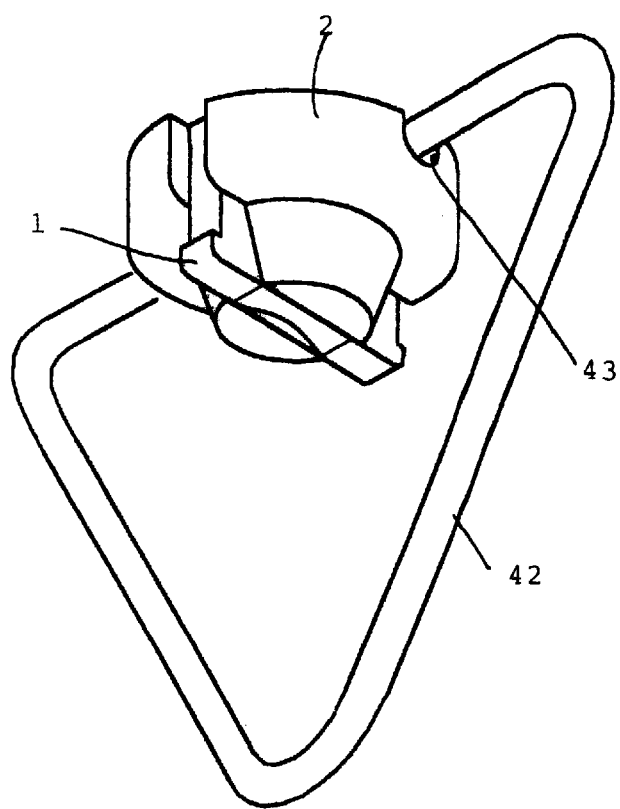
FIG. 39 is a perspective view of an application example where a suspension hook on ceiling is mounted by the article-fixing device of the present invention.
Figure 40:
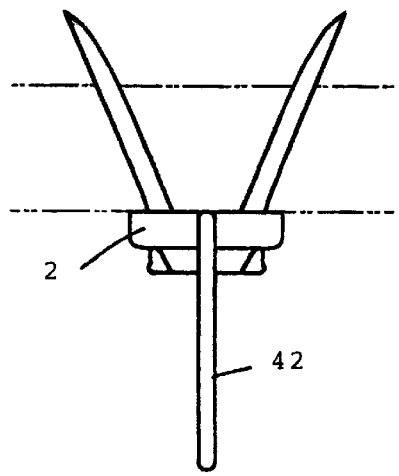
FIG. 40 is a front view of the application example of FIG. 39.
Figure 41:
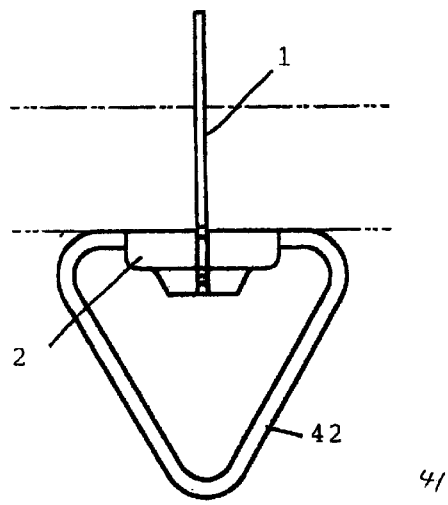
FIG. 41 is a side view of the application example of FIG. 39.
Figure 42:
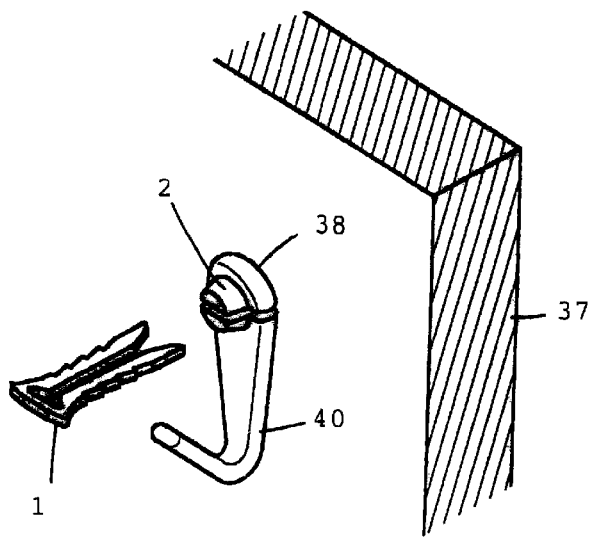
FIG. 42 is a perspective view of a condition before mounting of an application example where the washer of the article-fixing device of the present invention is integrated with the object to be fixed.

In the application examples shown in FIGS. 39, 40 and 41, a triangular suspension ring 42 is provided with an engaging hole 43 instead of the collar 34. The engaging holes 43 are arranged at opposed positions on side wall of the washer 2, and the suspension ring is used as a suspension device on ceiling. In the variations shown in FIG. 42 or FIG. 43, the washer 2 is integrally molded with the mounting portion 38 of the suspension hook 40, and it is fixed on a weak board 37 using the pin unit 1.

Figure 44:
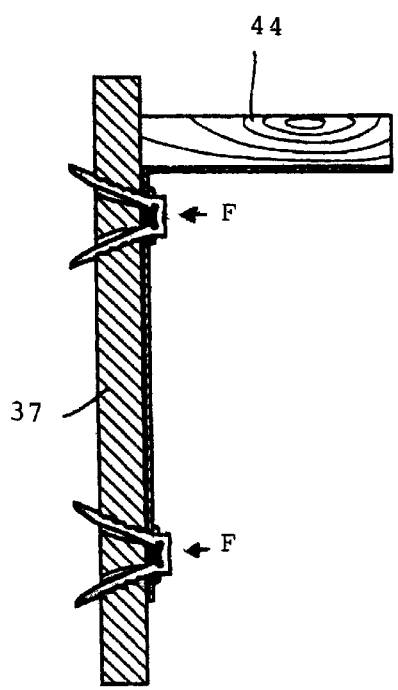
FIG. 44 is a cross-sectional view of an application example where the article-fixing device of the present invention is used for fixing a shelf.
Figure 45:
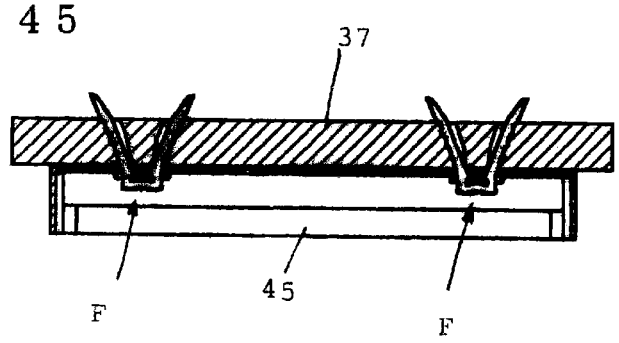
FIG. 45 is a cross-sectional view of an application example where the article-fixing device of the present invention is used for fixing a lighting fixture.
Figure 46:
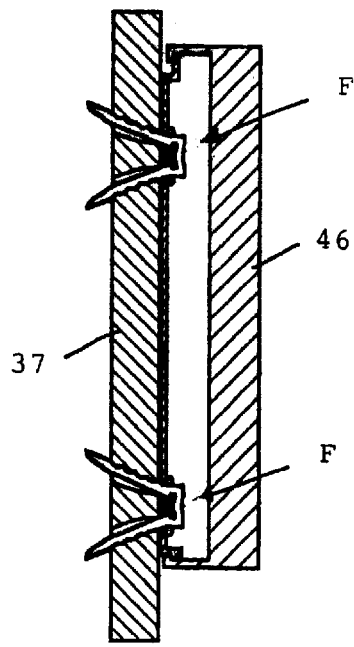
FIG. 46 is a cross-sectional view of an application example where the article-fixing device of the present invention is used for fixing an air conditioner.

FIG. 44 shows an application example where the pin unit is used for mounting a shelf 44. FIG. 45 shows an application example where it is used for mounting a lighting fixture 45. FIG. 46 shows an application example where it is used for mounting an air conditioner 46. In each of these cases, the object to be fixed is fixed on the weak board 37 using the article-fixing, device of the present invention.

Figure 47:
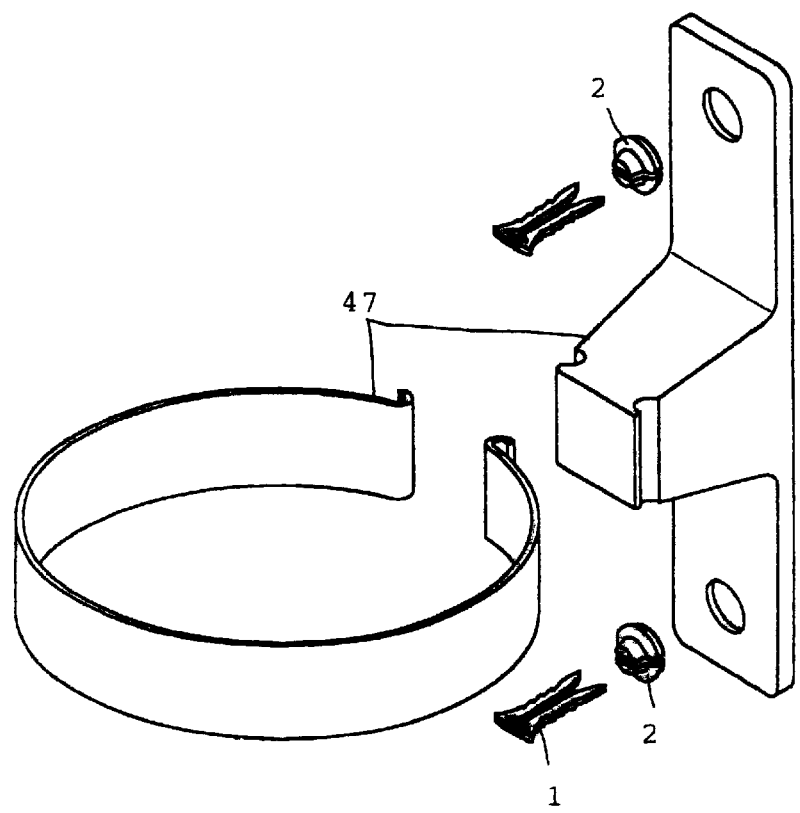
FIG. 47 and FIG. 48 each represents a perspective view of an application example where the article-fixing device of the present invention is used for fixing a gutter fixture.
Figure 48:
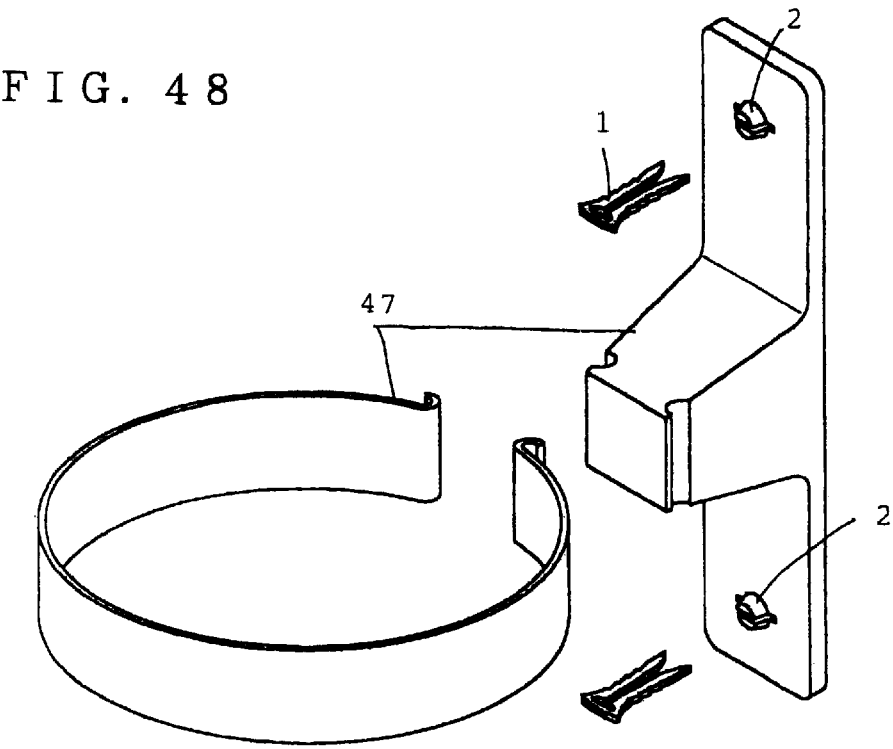
Figure 49:
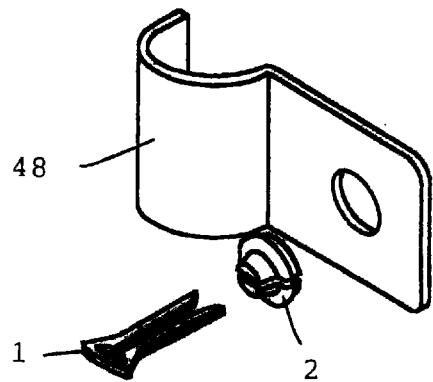
FIG. 49 and FIG. 50 each represents a perspective view of an application example where the article-fixing device of the present invention is used for fixing a wiring fixture.
Figure 50:
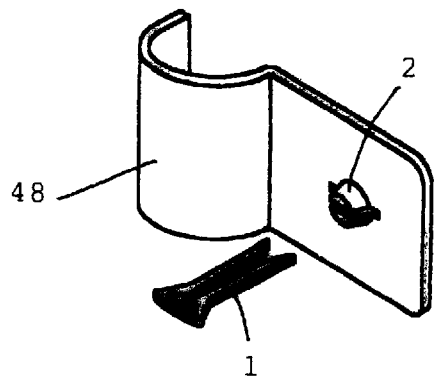
Figure 51:
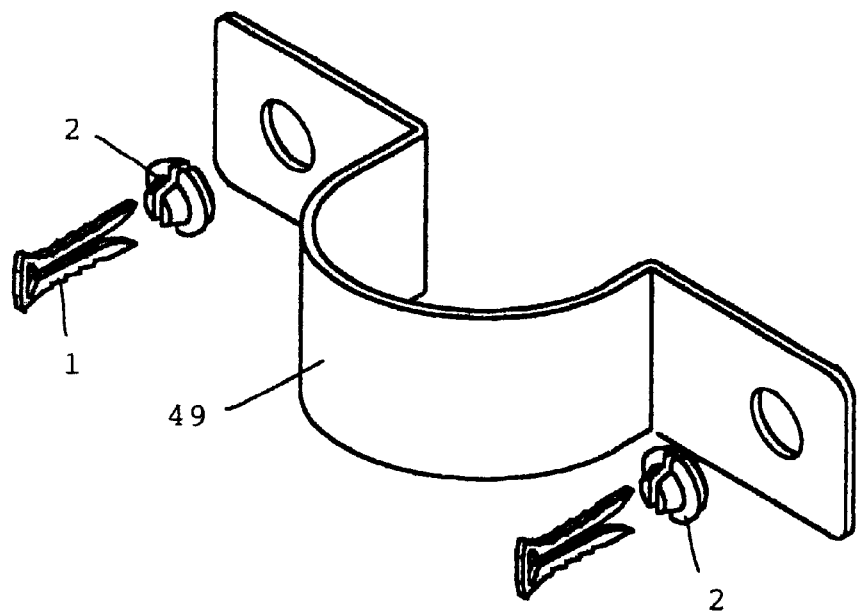
FIG. 51 and FIG. 52 each represents a perspective view of an application example where the article-fixing device of the present invention is used for fixing an external wire conduit fixture.
Figure 52:
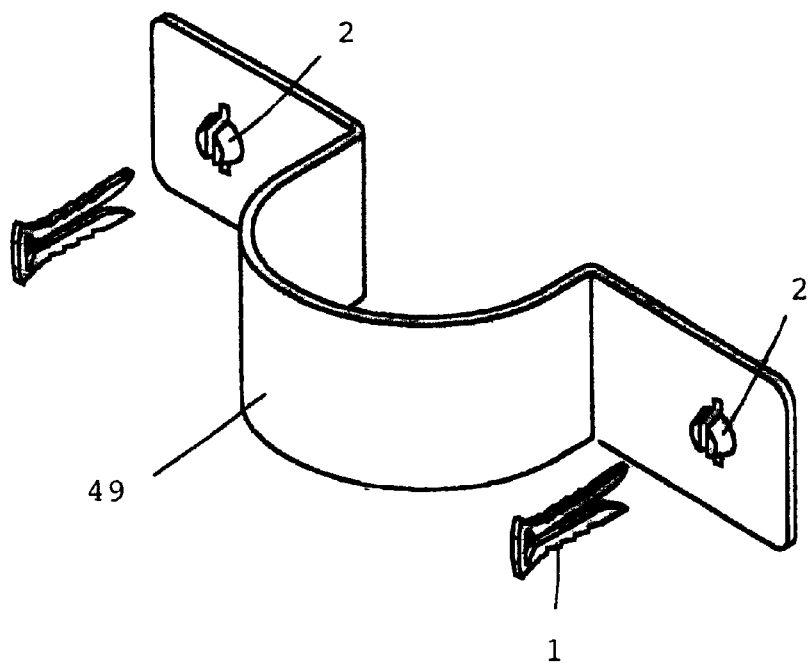

Further, FIG. 47 and FIG. 48 each represents an application example for fixing a gutter fixture 47. FIG. 49 and FIG. 50 each represents an application example for fixing a wiring fixture 48. FIG. 51 and FIG. 52 each represents an application example for fixing an external wire conduit fixture. In these examples, the device of the present invention is used in separate type or integrated type depending on the relationship of the washer 2 with the mounting member.

Figure 53:
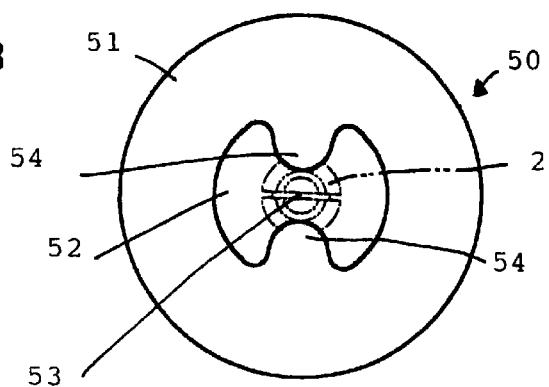
FIG. 53 is a plan view of a washer holder for holding a washer of the article-fixing device of the present invention.
Figure 54:
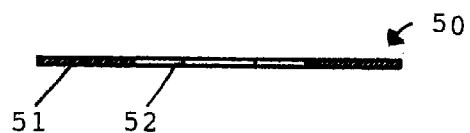
FIG. 54 is a cross-sectional view of the washer holder of FIG. 53.

When an object is mounted on wall surface such as a weak board using the article-fixing device of the present invention, and if it becomes necessary to remove the object for some reason, the pin unit must be withdrawn. In a washer holder 50 used for this purpose, a through-hole 52 penetrating vertically at the center of a circular disk 51 is formed as shown in FIG. 53 and FIG. 54. On a narrowed portion 53 of the through-hole 52, a pair of tongues 54 and 54 are projected toward inner side of the through-hole 53 at opposed positions, and these tongues are integrated with the circular disk 51. The narrowed portion 53 has such a gap that upper surface of edge of the washer 2 can be pressed down from both sides by a pair of tongues 54 and 54. The through-hole 52 has such size that, when the upper surface of the edge of the washer 2 is pressed down using the pair of tongues 54 and 54, at least the forward portion of pliers or pincers can be easily inserted into gaps on both sides with the washer 2 at the center in a direction perpendicular to the direction of the opposing tongues 54 and 54.

Figure 55:
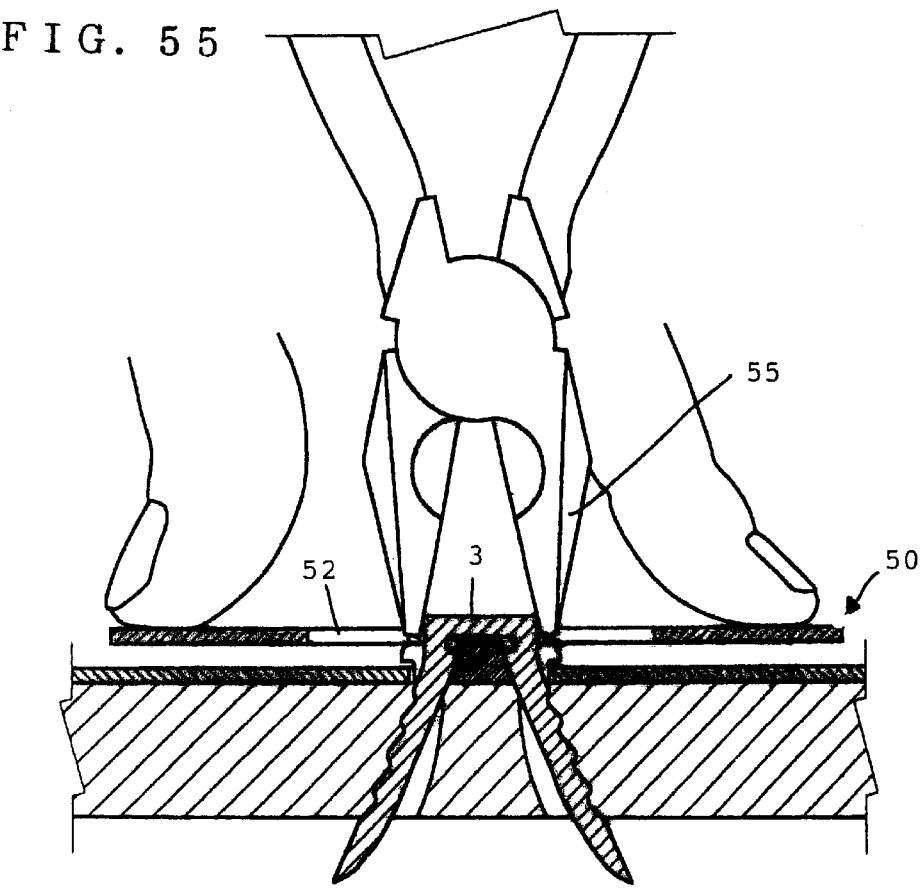
FIG. 55 is a cross-sectional view showing how the washer holder of FIG. 53

To withdraw the pin unit 1 using the washer holder 50 with the above arrangement, upper surface of the edge of the washer 2 is pressed by the tongues 54 and 54 from both sides with the top of the pin unit 1 (exposed above the washer 2) at the center. Next, the forward portion of pliers 55 is inserted into a space of the through-hole 52 on each side of the washer 2 as if the washer 2 is squeezed. Next, the head 3 of the pin unit exposed above the washer 2 is sandwiched from both sides using the pliers 55, and the pin unit 1 is withdrawn while pressing the washer 2 by the washer holder 50 (FIG. 55). The trace of the pin unit after it has been withdrawn is very small, being in the size equal to thickness of the blade. In case expanded portions 7 and 7 are provided on each side of the head 3 of the pin unit or in case projections 27 and 27 are arranged on both sides of the head 23, it is very convenient to withdraw the pin unit 1 or 21 because these projections can be engaged with pliers or pincers.

Figure 13:
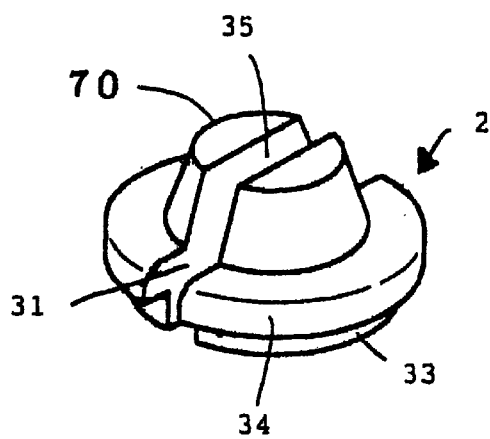
FIG. 13 is a perspective view of an example of a washer, which is a component part of the article-fixing device of the present invention.
Figure 14:
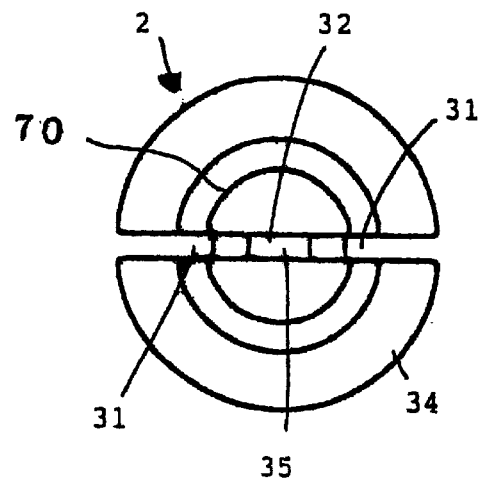
FIG. 14 a plan view of the washer shown in FIG. 13.
Figure 15:
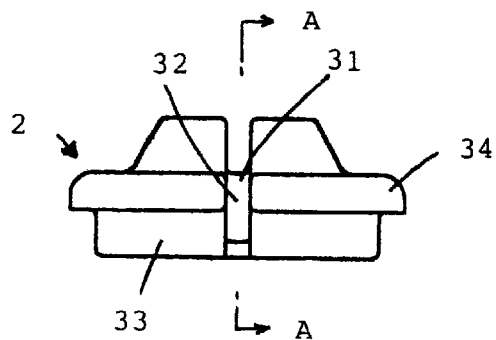
FIG. 15 is a side view of the washer shown in FIG. 13.
Figure 16:
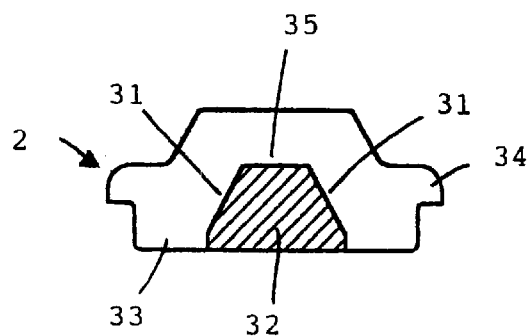
FIG. 16 is a cross-sectional view along the line A—A in FIG. 15 as seen from arrow direction.
Figure 43:
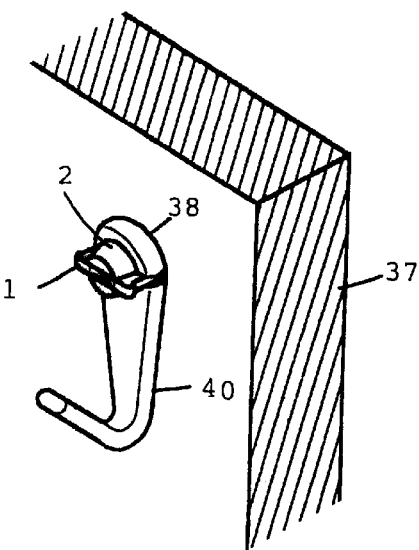
FIG. 43 is a perspective view showing the condition of the example of FIG. 42 after mounting.

When the pin unit 1 or 21 once driven is to be withdrawn, pincers or pliers are used as described above. If both lateral ends of the head 3 of the pin unit 1 are exposed as shown in FIG. 34 or FIG. 43, the head can be easily squeezed, and it is very convenient. To facilitate exposure of the lateral ends of the head 3 of the pin unit 1 as described above, diameter of upper portion of the head of the washer 2 must be smaller than the lateral dimension of the head 3 of the pin unit 1. Specifically, as shown in FIG. 13, the washer 2 comprises a central projection 70 and a flange unit 34 (engaging unit) extending in radial outward direction from the base of the projection 70, and a pair of the guide gaps 31 are defined by the projection 70 and the flange unit 34 (engaging unit). Lower portion of the flange unit 34 (engaging unit) is designed as an annular plate, and this annular plate can be brought into contact with the object 36 as shown in FIG. 20 or 21. Therefore, when the object is mounted by the pin unit 1, the annular plate has functions to engage with, hold and fix the object to be fixed.

Figure 62:
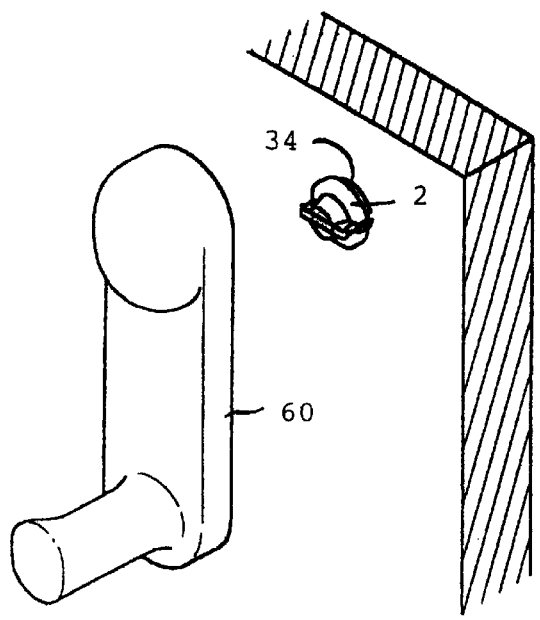
FIG. 62 is an exploded view of another application example were the article-fixing device of the present invention is used.
Figure 63:
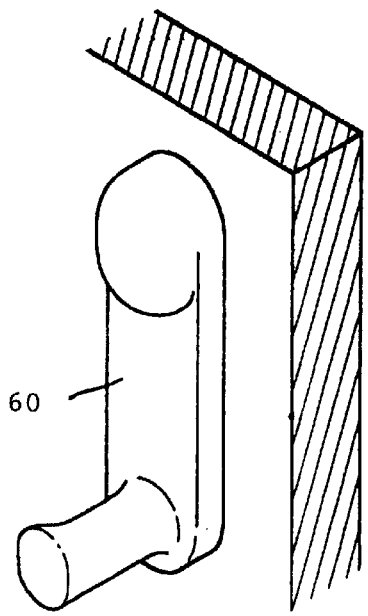
FIG. 63 is a perspective view showing how the application example of FIG. 62 is used.
Figure 64:
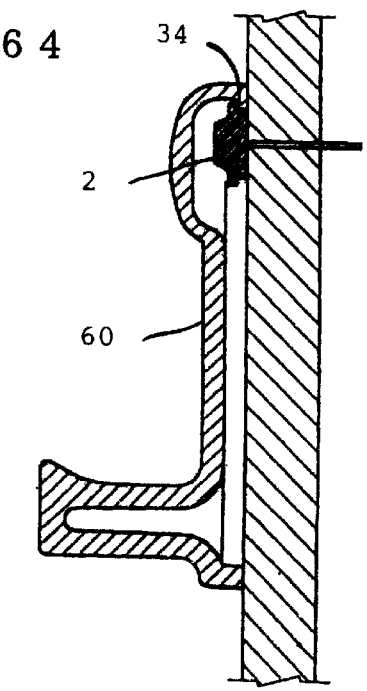
FIG. 64 is a cross-sectional view of an example shown in FIG. 62.
Figure 65:
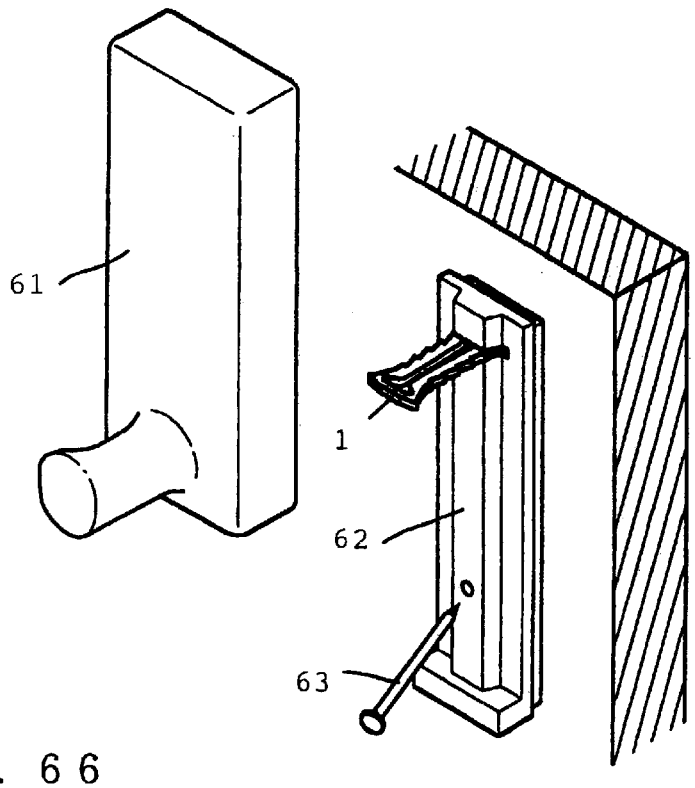
FIG. 65 is an exploded view showing another application example of the article-fixing device of the present invention.
Figure 66:
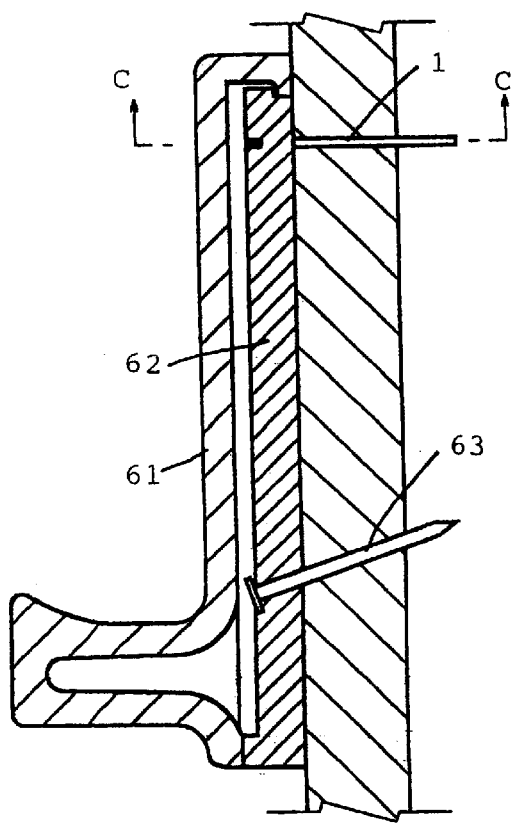
FIG. 66 is a cross-sectional view of an application example shown in FIG. 65.
Figure 67:
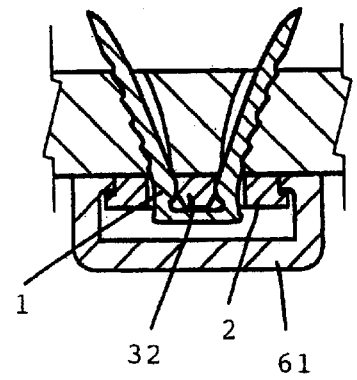
FIG. 67 is a cross-sectional view along the line C—C in FIG. 66 as seen from arrow direction.
Figure 68:
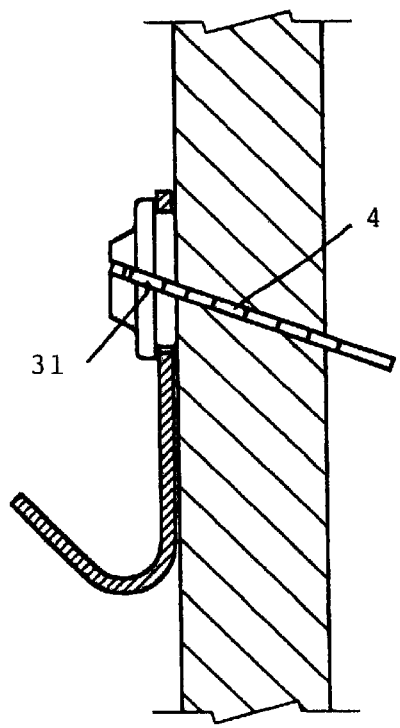
FIG. 68 is a cross-sectional view of an application example where the pin unit of the article-fixing device of the present invention is driven in oblique direction.

As shown in FIGS. 62, 63 or 64, as an application example of the article-fixing device of the present invention, a suspension hook 60 may be engaged from rear side with the collar 34 of the washer 2, which is fixed in advance on the wall surface using the pin unit. In the application example shown in FIGS. 65, 66 and 67, a washer 2 provided with a support base 32 is integrally buried on upper portion of a mounting member 62 to retain the hook 61 so that the upper portion can be fixed by the pin unit 1, and the lower portion is fixed by a plain nail 63 to firmly mount the suspension hook. Further, in the article-fixing device of the present invention, the angle of driving of the pin unit is not necessarily perpendicular to wall surface, and the pin unit may be driven obliquely as shown in FIG. 68. In this case, the guide gaps 31 and 31 for guiding the driving of the two legs 4, 14 or 24 of the pin unit are provided naturally in oblique direction.

INDUSTRIAL APPLICABILITY

As described above, it is possible according to the article-fixing device of the present invention to produce a device at lower cost and in large quantity, which is used to mount and fix an object on wall surface or ceiling made of weak board such as plaster board, aerated lightweight concrete (ALC) or veneer. Also, it is possible to drive the pin unit accurately and assuredly and to firmly fix the object to be fixed. According to the method for removing the article-fixing device of the present invention, the pin unit already driven can be withdrawn by simple procedure, and the article-fixing device of the present invention can be easily removed.

What is claimed is:

1. An article-fixing device, comprising:
   a pin unit which has a flat shape and has fork shaped legs which extend from a head of the pin unit, and which have tips that are tapered and that have curved portions which curve outwardly with respect to one another;
   a washer which comprises:
      a pair of guide gaps arranged on opposed sides of a support base, the support base being adapted to spread said forked legs apart at a constant angle as they are inserted into the guide gaps
      a projection positioned at a center of the support base, an upper surface of said projection having a diameter which is smaller than a lateral dimension of the head of said pin unit, and
      a flange unit extending in radial outward direction from a base of said projection,
      whereby when said pin unit is completely driven into a mounting site in combination with said washer, an upper surface of the head of said pin becomes flush with an upper surface of said projection and lateral ends of said pin unit are exposed from said projection and said flange unit.

2. The article-fixing device according to claim 1, wherein a reinforcement rib extends longitudinally along a flat surface of each of the legs of said pin unit.

3. The article-fixing device according to claim 1, wherein a dented portion is formed in an inboard surface of each of the legs proximate the head portion of said pin unit.

4. The article-fixing device according to claim 3, wherein the head of the pin unit has an outwardly extending portion which extends out on each side of the head at a location essentially opposite a dented portion.

5. The article-fixing device according to claim 1, wherein a projection is provided on each side of the head portion of the pin unit.

6. The article-fixing device according to claim 1, wherein said pair of legs are curved outwardly in bow-shape so that a distance between the legs is minimal at essentially a mid-portion of the legs.

7. The article-fixing device according to claim 1, wherein serrated blades are formed on an outer side of each of said legs.

8. The article-fixing device according to one of claim 1, wherein said washer is integrally mounted on an object to be fixed to a surface.

9. An article-fixing device, comprising a pin unit and a washer for securing an object to a surface, wherein:
said pin unit has a flat shape and and has forked legs which extend from a head portion of the pin unit, the forked legs each having tips which are tapered and angled out away from each other; and wherein:
said washer comprises:
a pair of guide gaps which each receive a leg of the pin and which are arranged on opposed sides of a support base that drives said forked legs away from each other at a constant angle, as the forked legs a inserted through the guide gaps
a projection positioned at a center of said washer, an upper surface of said projection being smaller in diameter than the lateral dimension of said head of said pin unit, and,
an engaging unit extending radially outward from a base of said projection, whereby when said pin unit is completely driven into a mounting site in combination with said washer, an upper surface of the head of said pin unit becomes flush with the upper surface of said projection, and so that the lateral ends of said pin unit are exposed from said projection and said engaging unit.

10. An article-fixing device, comprising a pin unit and a washer,
wherein said pin unit comprises:
two legs which extend essentially in parallel to each other and which are inserted into a fixing site to secure an object in position at the site; and
a head which connects upper portions of said two legs so that the pin unit has a flat U-shaped form; and wherein
said washer comprises a support base and two guide gaps, the guide gaps being located on opposite sides of the support base and each guiding a leg of said pin unit, the support base spreading said two legs when an external force is applied to said pin unit and said two legs are advanced through said guide gaps; and
a projection positioned at a center of the support base, an upper surface of said projection having a diameter which is smaller than a lateral dimension of the head of said unit, and
a flange unit extending in radial outward direction from a base of said projection,
whereby when said pin unit is completely driven into a mounting site in combination with said washer, an upper surface of the head of said pin becomes flush with an upper surface of said projection and lateral ends of said pin unit are exposed from said projection and said flange unit.

11. The article-fixing device according to claim 10, wherein a distance between the two legs increases from an upper portion at the head, toward tips of the legs.

12. The article-fixing device according to claim 10, wherein a width of said support base widens in a direction in directions the legs are forced through the guide gaps.

13. The article-fixing devise according claim 10, wherein irregular forms are arranged on an outer side of each leg from a tip toward the head so that a width of each leg is repeatedly changed.

14. The article-fixing device according to claim 10, wherein said washer has, in upper portion thereof, an annular plate, which can be brought into contact with the object to be fixed so that the washer serves as an engaging unit to engage with the object to be fixed.

15. An article-fixing device, comprising a pin unit and a washer for supporting an object to be fixed, wherein:
said pin unit is flat and has fork-shaped legs which extend from a head of the pin unit, and which have tips that are tapered and that curve away from one another; and wherein:
said washer comprises:
a pair of guide gaps arranged at opposed positions with respect to one another for guiding the said forked legs and for maintaining the legs at a constant angle as the forked legs are driven through the guide gaps and are spread out by a support base and,
a flange unit extending in a direction which intersects said pair of guide gaps and which is outwardly oriented from a central projection in which the support base and said projections are formed, the projection being so dimensioned and configured that when said pin unit is completely driven into a mounting site an upper surface of the head of said pin unit becomes flush with upper surface of the projection and so that lateral ends of the head of said pin unit extend out from said projection and said flange unit.

16. An article-fixing device, comprising a pin unit and a washer for supporting an object to be fixed, wherein:
said pin unit has a flat shape, its formed by punching a metal plate, and has fork-shaped legs extending from a head of the pin unit, tips of the legs being tapered and spread out; and wherein
said washer comprises:
a pair of guide gaps which are arranged at opposed positions with respect to one another and guide the forked legs at a constant angle, when the forked legs are inserted into the guide gaps are spread out by a support base located between the pair of guide gaps
an engaging unit to engage the object to be fixed, and
a projection positioned at a center of the washer in which the pair of guide gaps and the support base are formed, and which is so dimensioned and configured that when said pin unit is completely driven into a mounting site with said washer, an upper surface of said head of said pin unit becomes flush with an upper surface of said projection, and lateral ends of the head of said pin unit are exposed on either side of the projection and said engaging unit.

* * * * *